UNITED STATES PATENT OFFICE.

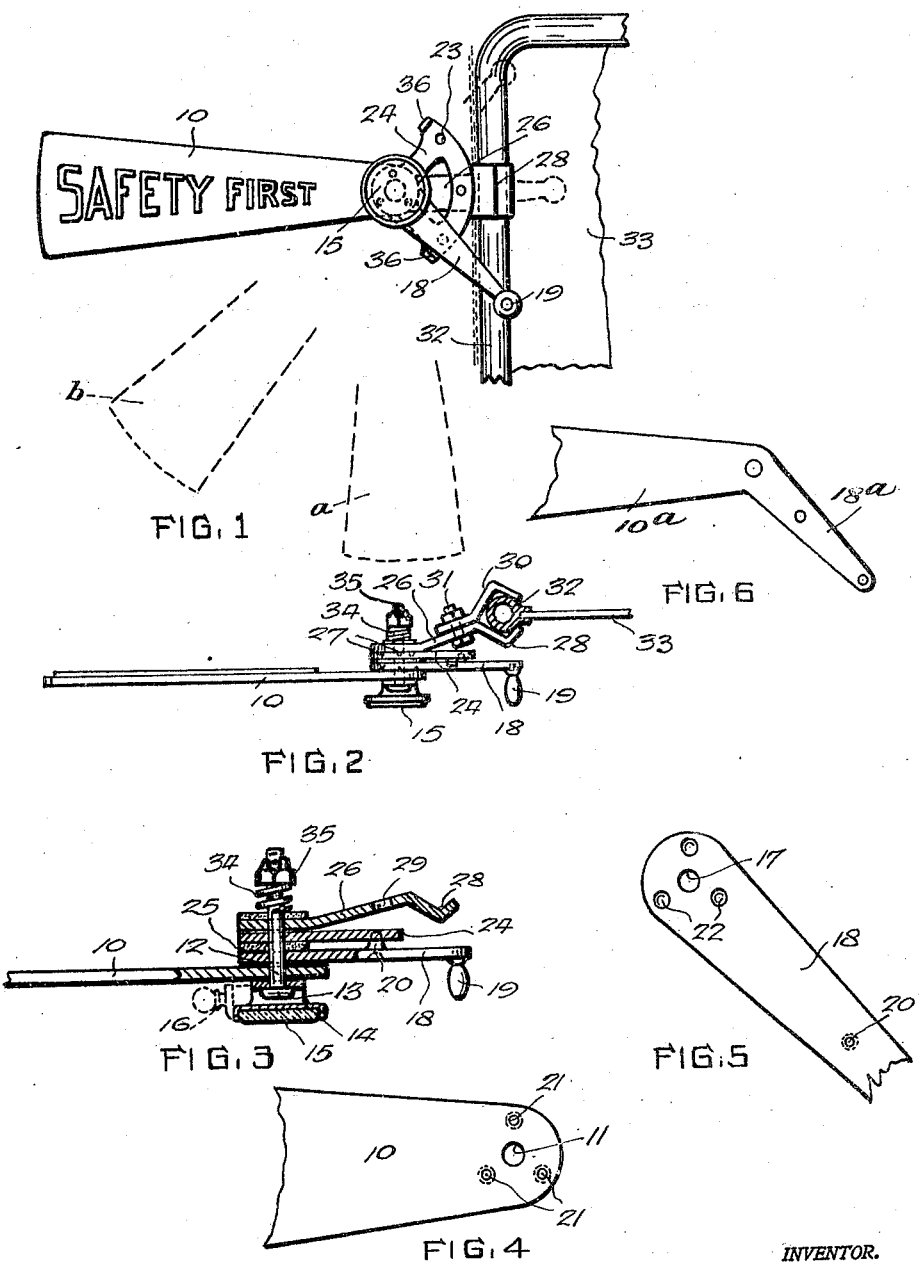

JOHN THOMAY, OF COLUMBUS, OHIO.

AUTOMOBILE SIGNAL.

1,410,850.   Specification of Letters Patent.   Patented Mar. 28, 1922.

Application filed April 22, 1921. Serial No. 463,450.

*To all whom it may concern:*

Be it known that I, JOHN THOMAY, a citizen of the United States of America, residing at Columbus, in the county of Franklin and State of Ohio, have invented certain new and useful Improvements in Automobile Signals, of which the following is a specification.

My present invention relates generally to signals, and more particularly to automobile signals, my object being the provision of a simple inexpensive device capable of easy convenient hand manipulation and susceptible of ready connection and installation especially in connection with those vehicles having windshields.

In the accompanying drawing which illustrates my present invention and forms a part of this specification, Figure 1 is an elevation showing the practical application of my invention, Figure 2 is a sectional top plan view, Figure 3 is an enlarged plan view partly broken away and in section, Figure 4 is a side view of the inner end of the signal arm, Figure 5 is a side view of the inner portion of the lever, and Figure 6 is a side view of a modified construction in which the signal arm and its lever are integral.

Referring now to these figures my invention proposes an arrangement including an outstanding signal arm 10, one end of which has a bolt receiving aperture 11 as in Figure 4 through which a bolt 12 forming the pivot of swinging movement of the signal arm is adapted to extend. As shown in Figure 3 the head 13 of bolt 12, at one side of the signal arm, may support a bracket 14 carrying a mirror 15, and may also support a light bulb and its holder indicated in dotted lines at 16 to cast a beam on the signal arm 10 making the same readily visible at night.

The pivot bolt 12 also extends through an opening 17 at the inner end of a lever 18 having at its outer end a handle 19 and also having intermediate its ends a laterally projecting stud 20, the said inner bolt receiving end of lever 18 having operative connection with the signal arm 10 by virtue of relatively engaging studs 21 and stud receiving recesses 22 around the apertures 11 and 12, studs 21 being carried by the signal arm 10 and recesses 22 being formed in the lever 18.

The intermediate laterally projecting stud 20 of lever 18 cooperates with upper, lower and intermediate recesses 23 of a segmental bracket 24 through which the bolt 12 also passes, bracket 24 being separated from the lever 18 and the signal arm 10 by a washer 25 interposed therebetween and around the bolt 12. Bracket 24 is disposed in face to face engaging relation with an attaching arm 26 through whose inner portion bolt 12 passes, the said bracket and said attaching arm being in engaged relation by virtue of relatively engaging studs and recesses 27 as shown in Figure 2 similar to the studs and recesses 21 and 22 establishing engagement between the signal arm 10 and its actuating lever 18.

The attaching arm 26 has an angular outer end 28 and an opening 29 intermediate its ends adapting the same to receive a coacting angular clamp 30 attached thereto by a clamping bolt 31 which passes through the opening 29 so that the angular portion 28 and the coacting clamp 30 are thus adapted to effectively engage the metal frame 32 of an automobile windshield 33 as seen particularly in Figures 1 and 2. It is to be understood however that the attaching arm 26 may be extended and secured by a screw, bolt or the like to the cab of a truck or other vehicle of a type which does not present a metallic portion of its windshield to effective engagement by a clamp of the type shown.

It is obvious from an inspection of Figure 1 that it is simply necessary to grasp the handle 19 and shift the same up and down in order to move the signal arm 10 between the positions shown in full and dotted lines in Figure 1, the lowered position shown at the dotted lines *a* indicating the at rest position and that indicated by the dotted line *b* indicating for instance a turn while the position in full lines indicates the intention of the operator to stop. These movements and the shifting of the lug 20 of lever 18 into and out of the recesses 23 of the segmental bracket 24 is permitted by virtue of the fact that the bolt 12 carries a spring 34 pressing the several parts 10, 18, 24 and 26 toward one another, a nut 35 controlling the effective pressure of this spring. It will also be noted that the segmental bracket 24 has end flanges 36 which limit movement of the lever 18 and prevent shifting of the same beyond the ends of the bracket.

The attaching arm 26 and the bracket 24 are held relatively immovable by virtue of their connections previously described and in a manner similar to that contemplated in connection with the signal arm 10 and its lever 18, although I may provide a signal arm 10ª integral as in Figure 6 with a lever 18ª.

I claim:

A traffic signal for automobiles including a pivot forming bolt having a head at one end and an adjusting nut threaded thereon, a signal lever including a signal arm at one side of the bolt and a handle arm at the opposite side of the bolt, said signal arm and said handle arm having inner overlapping ends provided with apertures through which the bolt projects and also provided with relatively engaging projections and recesses around said openings to normally hold the arms in position for rotative adjustment and against rotative displacement, a bracket arm and an attaching arm, the latter of which outstands at an angle to the former and is provided with clamping means at its outer end, said bracket and attaching arms having overlapping apertured ends also receiving the pivot bolt and provided with relatively engaging projections and recesses around the bolt normally holding the same in rotatively adjustable and non-displaceable relation, a spring on the bolt compressed between one end thereof and the several arms to yieldingly hold the latter against one another, and washers around the bolt between the signal lever and the said bracket and attaching arms, said handle arm and said bracket arm having relatively engaging means to hold the signal lever in adjusted position.

In testimony whereof I have affixed my signature.

JOHN THOMAY.